United States Patent
Yamate et al.

(10) Patent No.: US 6,961,078 B2
(45) Date of Patent: Nov. 1, 2005

(54) METHOD FOR PUTTING COLOR TO GLASS

(75) Inventors: Takashi Yamate, Mie (JP); Hiroyuki Tamon, Mie (JP); Shinji Nishikawa, Mie (JP); Hiroshi Uemura, Saitama (JP); Kohei Kadono, Osaka (JP); Tomoko Akai, Hyogo (JP); Masaru Yamashita, Osaka (JP); Tetsuo Yazawa, Osaka (JP)

(73) Assignees: Central Glass Company, Limited, Ube (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/447,288

(22) Filed: May 29, 2003

(65) Prior Publication Data

US 2004/0011968 A1 Jan. 22, 2004

(30) Foreign Application Priority Data

May 29, 2002 (JP) .................................... 2002-155094

(51) Int. Cl.[7] ................................................. B41J 2/44
(52) U.S. Cl. .................... 347/241; 347/256; 219/121.77
(58) Field of Search .............................. 347/233, 241, 347/243, 244, 256–259, 261; 219/121.6, 121.77

(56) References Cited

U.S. PATENT DOCUMENTS 5,059,763 A * 10/1991 O'Brien et al. ........ 219/121.69
5,206,496 A * 4/1993 Clement et al. ............ 250/271
5,521,628 A 5/1996 Montgomery ............... 347/243
2002/0153361 A1 * 10/2002 Sakamoto et al. ...... 219/121.73

FOREIGN PATENT DOCUMENTS

| EP | 422957 | * | 4/1991 | .......... G06K/15/12 |
| JP | 04-71792 | * | 3/1992 | ............ 219/121.68 |
| JP | 2002-348147 | * | 12/2002 | ........... B23K/26/00 |
| WO | 00/32348 A1 | | 6/2000 | |
| WO | 02/18090 A1 | | 3/2002 | |

OTHER PUBLICATIONS

U.S. Appl. No. 10/413,568.

Rainer, T., et al., "Farbige Innenbeschriftung von Floatglas durch $CO_2$–Laser–Bestrahlung" (1999), Abstract XP-001117571, pp. 127–130.

European Search Report dated Sep. 22, 2003.

* cited by examiner

*Primary Examiner*—Huan Tran
(74) *Attorney, Agent, or Firm*—Crowell & Moring LLP

(57) ABSTRACT

The invention relates to a method for putting color to glass. This method includes the steps of (a) introducing a laser beam into an interferometer such that the laser beam is split into at least first and second laser beams in the interferometer and that the at least first and second laser beams come out of the interferometer; and (b) irradiating a glass with the at least first and second laser beams to write a plurality of lines simultaneously on a surface of the glass and/or in an inside of the glass.

17 Claims, 2 Drawing Sheets

METHOD FOR PUTTING COLOR TO GLASS

BACKGROUND OF THE INVENTION

The present invention relates to a method for putting color to glass by laser irradiation. There are known the following methods for putting color to glass by laser irradiation.

An irradiation of an inside of a glass with a convergent ultraviolet laser can form a color center (e.g., non-bridging oxygen hole center) due to two-photon absorption. The light absorption by this color center provides a glass with a brown color. Thus, it is possible to put desirable marks on glass by laser beam irradiation.

Furthermore, an irradiation of an inside of a glass with a convergent ultraviolet laser can form a laser shot trace (refractive index modified portion) having a refractive index different from that of the surrounding glass. Although the resulting refractive index modified portion is transparent, it is seen as having a white color such as papermark (watermark) due to its modified refractive index as compared with that of the surrounding glass. Thus, it is also possible to put white marks on glass by laser beam irradiation.

Still furthermore, an irradiation of an inside or surface of a glass with a convergent ultraviolet laser can form cracks or defects to provide a white color. Thus, it is also possible to put white marks on glass by laser beam irradiation.

In particular, an irradiation of the surface of a silver-doped glass with a convergent ultraviolet, visible or infrared laser generates silver fine particles to put a brown, yellow or gold color on the glass.

Hitherto, the laser beam irradiation for putting color on glass has been conducted by using a single laser beam. Therefore, it has been necessary to take much time to put complicated marks by such a single laser beam irradiation.

SUMMARY OF THE INVENTION

It is therefore an object of the present invention to provide a method for putting color to glass, which method is capable of providing marks (such as letters, graphics, and drawings) with a short period of time.

According to the present invention, there is provided a method for putting color to glass, including the steps of:

(a) introducing a laser beam into an interferometer such that the laser beam is split into at least first and second laser beams in the interferometer and that the at least first and second laser beams come out of the interferometer; and (b) irradiating a glass with the at least first and second laser beams to write a plurality of lines simultaneously on a surface of the glass and/or in an inside of the glass.

DESCRIPTION OF THE PREFERRED EMBODIMENTS

Interferometer serves originally as an apparatus for forming an interference fringe (pattern) by splitting a single laser beam into a plurality of laser beams and then by crossing the plurality of laser beams with each other. In contrast with this, an interferometer according to the present invention (e.g., Mach-Zehnder interferometer and Michelson interferometer) is an apparatus in which a single laser beam is split into a plurality of laser beams and then the plurality of laser beams are made to be very close to each other by adjusting the crossing angle of the laser beams to a very small angle. With this, although the resulting laser beams coming out of the interferometer are actually separate from each other, but they are so close to each other that they are apparently seen as a single laser beam.

It is possible by the present invention to write at least two adjacent lines simultaneously on the surface of and/or in the inside of a glass by (a) converging the above-mentioned laser beams (apparently a single laser beam) at corresponding separate spots by an objective lens and by (b) scanning the glass with the laser beams through the galvanometer mirror adjustment. Therefore, it is possible to substantially shorten the period of time for providing glass with marks (such as letters, graphics, and drawings).

Figure 3:
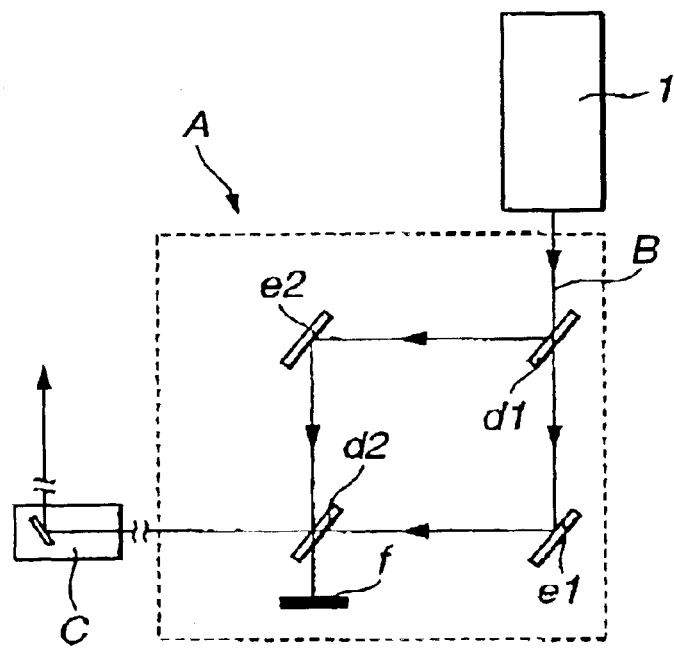
FIG. 3 is a schematic view showing a condition in which a single laser beam is split into two laser beams in a first interferometer.

FIG. 3 shows a first exemplary interferometer (Mach-Zehnder interferometer) for producing two split laser beams (which are very close to and parallel with each other) from a single laser beam, although the two split beams are shown therein as a single laser beam for simplification. The first interferometer includes first and second half mirrors (semitransparent mirrors) d1 and d2 and first and second mirrors (reflecting mirrors) e1 and e2 and is described in detail as follows. At first, a single laser beam B, which has been generated by a laser oscillator 1, is introduced into an inside of a first interferometer A (enclosed with a dotted line). Then, the single laser beam B is split by the first half mirror d1 into first and second laser beams. In other words, the first half mirror d1 is arranged as shown in FIG. 3 such that the single laser beam B is partly transmitted through the first half mirror d1 to generate the first laser beam and is partly reflected from the first half mirror d1 to generate the second laser beam. The first mirror e1 and the second half mirror d2 are arranged as shown in FIG. 3 such that the first laser beam is reflected from the first mirror e1 and then is partly transmitted through the second half mirror d2 to have a first optical axis. Furthermore, the second mirror e2 and the second half mirror d2 are arranged as shown in FIG. 3 such that the second beam is reflected from the second mirror e2 and then is partly reflected from the second half mirror d2 to have a second optical axis that is parallel with the first optical axis of the first laser beam.

The second half mirror d2 is arranged to have an inclination such that the first laser beam, which has been transmitted through the second half mirror d2, and the second laser beam, which has been reflected from the second half mirror d2, become adjacent or very close to each other to the extent that these laser beams are apparently seen as a single laser beam.

Figure 4:
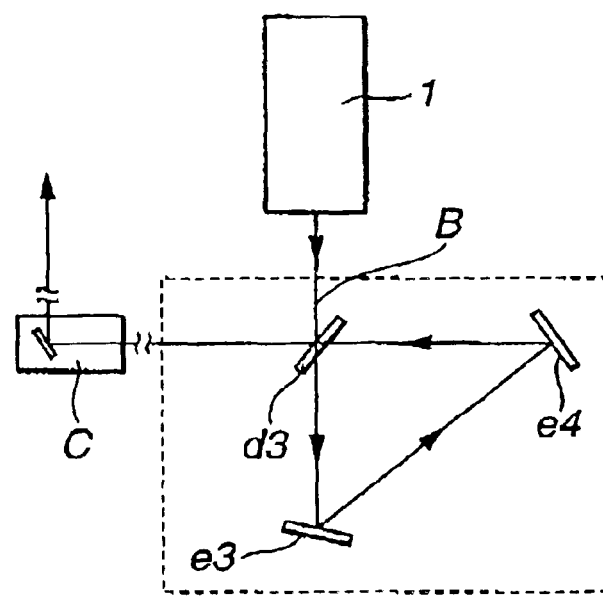
FIG. 4 is a schematic view showing a condition in which a single laser beam is split into at least two laser beams in a second interferometer.

If the first interferometer A is included in a laser irradiation apparatus, the half of the original laser beam generated from the laser oscillator 1 may be lost, since the laser beam beats on a shielding plate f (see FIG. 3), in contrast with the after-mentioned second interferometer of FIG. 4. If this shielding plate f is replaced with another galvanometer mirror C, it is possible to totally utilize the laser beam generated from the laser oscillator 1. The first interferometer (Mach-Zehnder interferometer) of FIG. 3 may be replaced with a Michelson interferometer, in order to perform the same function.

FIG. 4 shows a second exemplary interferometer for producing at least two split laser beams (which are very close to and parallel with each other) from a single laser beam, although the at least two split beams are shown therein as a single laser beam for simplification. The second interferometer includes a half mirror (semitransparent mirror) d3 and first and second mirrors (reflecting mirrors) e3 and e4 and is described in detail as follows. At first, a single laser beam B, which has been generated by a laser oscillator 1, is introduced into an inside of a second interferometer (enclosed with a dotted line). Then, the single laser beam B is split by the half mirror d3 into first and second laser beams. In other words, the half mirror d3 is arranged as shown in FIG. 4 such that the single laser beam is partly reflected from the half mirror d3 to generate the first laser beam (having a first optical axis) and is partly transmitted through the half mirror d3 to generate the second laser beam. The first and second mirrors e3 and e4 are arranged as shown in FIG. 4 such that the second laser beam is sequentially reflected from the first and second mirrors e3 and e4 to have a second optical axis that is parallel with the first optical axis of the first laser beam. Then, the second laser beam, which has been sequentially reflected from the first and second mirrors e3 and e4, is partly transmitted through the half mirror d3.

The half mirror d3 is arranged to have an inclination such that the first laser beam, which has been reflected from the half mirror d3, and the second laser beam, which has been transmitted through the half mirror d3 after the reflection from the first and second mirrors e3 and e4, become adjacent or very close to each other to the extent that these laser beams are apparently seen as a single laser beam.

In contrast with the first interferometer, it is possible by the second interferometer to totally utilize the laser beam generated from the laser oscillator 1.

Figure 1:
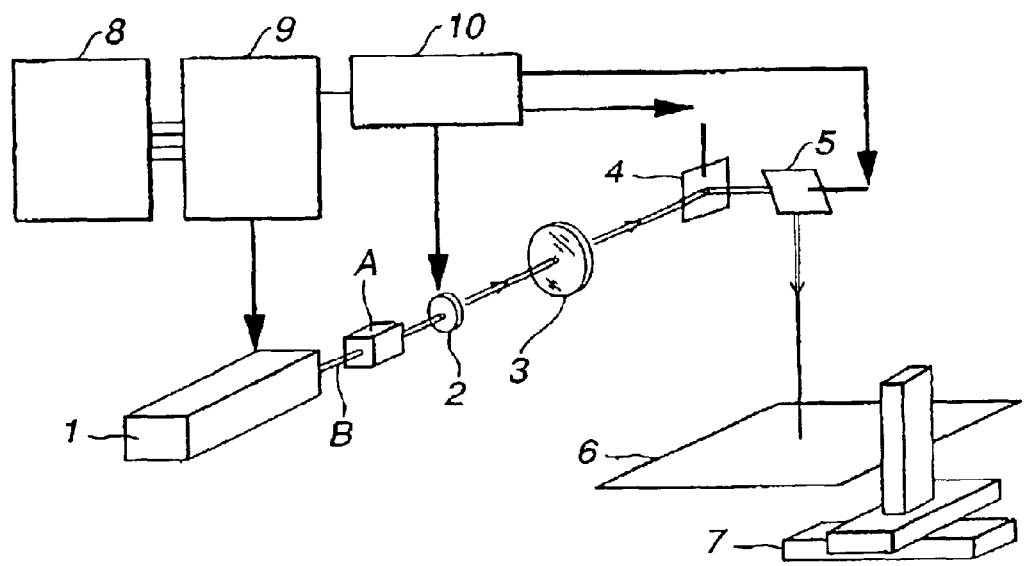
FIG. 1 is a schematic view showing a first laser irradiation apparatus using a condenser lens (Z lens) and an objective lens for controlling the position of the focal point of the laser light.

As is shown in FIG. 1, the first and second laser beams coming out of the first or second interferometer may pass through a condenser lens 2 mounted on a linear translator, as explained hereinafter. Then, they may pass through an objective lens 3 for converging them at two split spots in the inside or on the surface of a glass. The distance between the two split spots can be adjusted by changing the inclination of the second half mirror d2 (in the case of the first interferometer) or of the half mirror d3 (in the case of the second interferometer). The two split spots can be moved by suitably adjusting a galvanometer mirror C of FIG. 3 or 4 (having an X-mirror 4 and a Y-mirror 5 of FIG. 1), thereby writing two, separate, adjacent lines simultaneously in the inside or on the surface of a glass.

The method for putting color to glass according to the present invention may be conducted by using a first laser irradiation apparatus (see FIG. 1) including (a) a laser oscillator 1 for generating a single laser beam B, (b) the above-explained first or second interferometer A, (c) a light modulator (not shown in FIG. 1), (d) a condenser lens 2 mounted on a linear translator, (e) an objective lens 3, and (f) a galvanometer mirror 4, 5. Alternatively, it may be conducted by using a second laser irradiation apparatus (see FIG. 2) including (a) a laser oscillator 1 for generating a single laser beam B, (b) the above-explained first or second interferometer A, (c) a light modulator 12, (d) a galvanometer mirror 4, 5, and (e) an fθ lens 13.

The components (except the above-explained first and second interferometers A) of the first and second laser irradiation apparatuses are described in detail as follows.

The laser oscillator 1 may be a continuous laser oscillator for continuously emitting laser light or a pulsed laser oscillator for emitting laser light in a pulsed mode. Specific examples of high-output laser oscillator are carbon-dioxide laser oscillator, YAG laser oscillator, UV pulsed laser oscillator and argon ion laser oscillator.

The laser beam B may be of an infrared light, near infrared light, visible light, or ultraviolet light. It is possible to use a light having a wavelength of from 100 nm to 1 mm ($10^6$ nm). For example, it is possible to use a carbon-dioxide laser oscillator, UV pulsed laser oscillator, or argon ion laser oscillator.

The light modulator serves as a switching device. The light modulator accurately regulates switching on and switching off of the laser light irradiation by changing the direction of the laser light propagation or by transmitting or shielding the laser light. It is possible to put discontinuous marks by suitably switching the light modulator on and off. The light modulator may be either an acoustic optical modulator (AOM) or electric optical modulator (EOM).

When AOM is switched on, AOM propagates supersonic into quartz glass by a transducer (piezoelectric device) to change RF wave in a radio frequency range into supersonic and diffract the laser light by diffraction, grating through density fluctuation of quartz glass, thereby changing its optical path. When AOM is switched off, AOM allows the laser light to directly propagate into quartz glass.

EOM is a switching device for passing or shielding the laser light by changing the direction of polarization through applying voltage to the laser light.

The galvanometer mirror C is formed of a plurality of movable mirrors, for example, X-mirror 4 and Y-mirror 5, and is capable of changing the optical axis of the laser light by changing the angles of the mirrors. Thus, it is possible to freely put marks (color) on the target (glass) by suitably adjusting the angles of X-mirror and Y-mirror to change the optical path and to move the focus point of the laser light on the target.

It is possible by the method of the present invention to put color to glass with short tact time, low energy consumption, and superior productivity.

The condenser lens (mounted on a linear translator and movable along the optical axis) and the objective lens of the first apparatus and the fθ lens of the second apparatus serve to correct the focus position of the laser light (scanned arcuately by the galvanometer mirror), thereby condensing the laser light on the target and improving resolution.

The target (glass) for the laser beam irradiation is not particularly limited, as long as it can be irradiated with laser beam. It may have a shape of bottle in addition to platy shape.

As is seen from FIG. 1, a first laser irradiation apparatus is described in detail as follows. In the first apparatus, a condenser lens (Z lens) and an objective lens are used for controlling the position of the focal point of the laser light.

The first apparatus has a laser oscillator 1 (carbon-dioxide laser oscillator or UV pulsed laser oscillator), The UV pulsed laser oscillator may contain a built-in light modulator (AOM or EOM), which can be referred to as Q-switch. It is possible to condense the laser beam on the target 6 by moving a condenser lens (Z lens) 2 along the optical axis by a linear translator (not shown in FIG. 1) mounting thereon the condenser lens.

As is seen from FIG. 1, the laser light emitted from the laser oscillator 1 is passed through the interferometer A, the condenser lens 2 and an objective lens 3, then is reflected by X-mirror 4 and Y-mirror 5, and then reaches the target 6, thereby putting a color to the exposed portion of the target. While the laser light is condensed onto the target 6, the target is scanned with the laser light by regulating the movement of the galvanometer mirror.

In addition to the regulation of the galvanometer mirror, it is possible to scan the target 6 with the laser light to put color by suitably moving an XYZ-stage 7 (supporting thereon the target 6) having X- and Y-stages horizontally movable along the major surface of the target 6 and a Z-stage vertically movable relative to the target 6.

The scanning can be conducted as follows. Digital command data for regulating the movements of the X-mirror 4 and the Y-mirror 5 are previously input into a computer 8. Then, those data are converted into analog signals by a digital-to-analog converter 9. A servo driver 10 receives the analog signals, and drives and regulates the movements of the condenser lens 2 and the X-mirror 4 and the Y-mirror 5, based on the analog signals, thereby scanning the target 6 with the laser light as originally designed.

As is seen from FIG. 2, a second laser irradiation apparatus is described in detail as follows. In the second apparatus, an fθ lens is used for controlling the position of the focal point of the laser light.

In the second apparatus, the laser light B emitted from an argon ion laser oscillator 1 passes through the interferometer A and AOM 12, then is reflected by X-mirror 4 and Y-mirror 5, then is transmitted through an fθ lens 13, and then reaches a target 6 (e.g., a silver-doped silicate glass), thereby putting a color to the exposed portion of the target 6. While the laser light is condensed onto the target 6 by the fθ lens 13, the target is scanned with the laser light by regulating the movement of the galvanometer mirror 4, 5.

Figure 2:
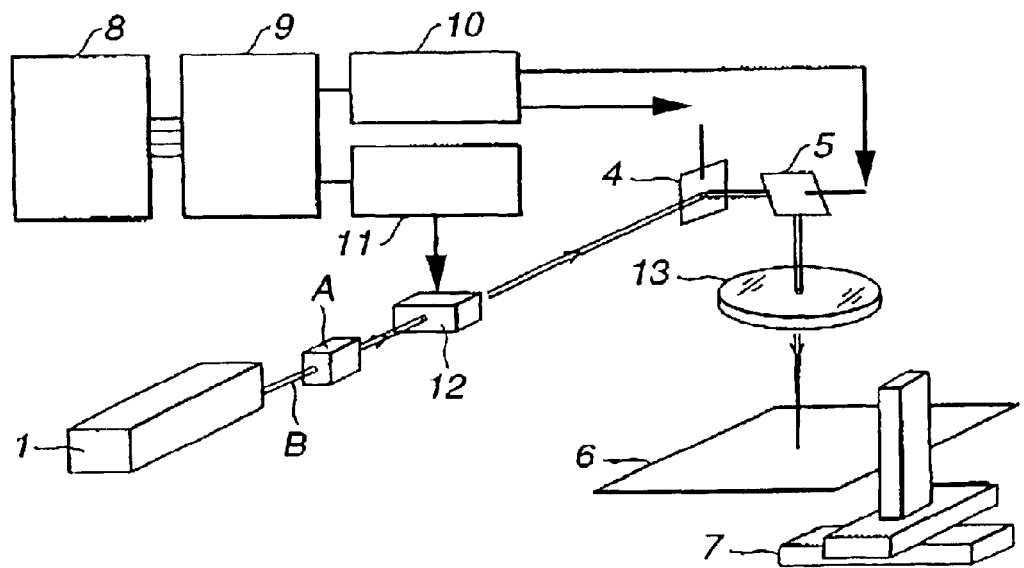
FIG. 2 is a schematic view showing a second laser irradiation apparatus using an fθ lens for controlling the position of the focal point of the laser light.

As shown in FIG. 2, AOM driver 11 converts the laser modulation signals (obtained by converting digital signals from the computer 8 into analog signals by the digital-to-analog converter 9) into radio frequency signals (RF signals) and generates supersonic in AOM 12 through a piezoelectric device (transducer). The laser light incident on AOM 12 is diffracted by a diffraction grating, thereby changing its optical path. As a result, the laser light is switched on or off.

In addition to the regulation of the galvanometer mirror, it is possible to scan the target 6 with the laser light to put color by suitably moving an XYZ-stage 7 (supporting thereon the target 6) having X- and Y-stages horizontally movable along the major surface of the target 6 and a Z-stage vertically movable relative to the target 6.

The scanning can be conducted as follows. Digital command data for regulating the movements of the X-mirror 4 and the Y-mirror 5 are previously input into a computer 8. Then, those data are converted into analog signals by a digital-to-analog converter 9. A servo driver 10 receives the analog signals, and drives and regulates the movements of the X-mirror 4 and the Y-mirror 5, based on the analog signals, thereby scanning the target 6 with the laser light as originally designed.

The following nonlimitative Example is illustrative of the present invention.

EXAMPLE

The first laser irradiation apparatus (shown in FIG. 1) was used for putting a color to a silver-doped glass (target). A single laser beam B was oscillated by the UV pulsed laser oscillator 1 to have a wavelength of 355 nm, a pulse width of 20 nm, a repetition frequency of 25 kHz, and a pulse energy of 180 μJ. The single laser beam B was split into two adjacent parallel laser beams by the interferometer A in a manner to have a split distance of 30 μm between the two laser beams on the target 6 by adjusting the inclination of the half mirror of the interferometer. The resulting two laser beams (apparently a single laser beam) were passed through the condenser lens 2 and the objective lens 3, then were reflected from X-mirror 4 and Y-mirror 5, and then were condensed on the surface of the silver-doped glass thickness: 6 mm; widths: 100 mm).

The target 6 was prepared as follows. At first, there was prepared a soda-lime glass substrate (thickness: 6 mm; widths: 100 mm) having a chemical composition of 72 wt % $SiO_2$, 16 wt % $Na_2O$, 10 wt % CaO, and 2 wt % $Al_2O_3$. Then, the glass substrate was immersed for 30 min in a fused salt (prepared by mixing 1 part by mol of $AgNO_3$ with 4 parts by mol of $NaNO_3$) heated at 590K (317° C.), thereby replacing Na ions of the glass surface with silver ions.

The target 6 (silver-ion-containing glass) was scanned with the two laser beams to have a shot distance of 25 μm and a scanning speed of 610 mm/s, thereby irradiating a square portion (1 mm×9 mm) of the target.

It was possible by a single laser irradiation to simultaneously write two lines (made of silver fine particles formed by silver aggregation) with a shot mark diameter of 10 μm, a shot distance of 25 μm and a line spacing of 30 μm.

The entire contents of Japanese Patent Application No. 2002-155094 (filed May 29, 2002), which is a basic Japanese application of the present application, are incorporated herein by reference.

What is claimed is:

1. A method for putting color to glass, comprising the steps of:
   (a) introducing a laser beam into an interferometer that is configured to split the laser beam into at least first and second laser beams and configured to make the at least first and second laser beams very close to each other through an adjustment of a crossing angle of the at least first and second laser beams; and
   (b) scanning a glass with the at least first and second laser beams, which have come out of the interferometer, by using a single pair of galvanometer mirrors, to write a plurality of lines simultaneously on a surface of the glass and/or in an inside of the glass.

2. A method according to claim 1, which is conducted by using an apparatus comprising (a) a laser oscillator for generating the laser beam, (b) the interferometer comprising a mirror and a half mirror, (c) a light modulator, (d) a condenser lens mounted on a linear translator, (e) an objective lens, and (f) a galvanometer mirror.

3. A method according to claim 1, which is conducted by using an apparatus comprising (a) a laser oscillator for generating the laser beam, (b) the interferometer comprising a mirror and a half mirror (c) a light modulator, (d) a galvanometer mirror, and (e) an fθ lens.

4. A method according to claim 1, wherein the interferometer is a Mach-Zehnder interferometer or Michelson interferometer.

5. A method according to claim 1, wherein the interferometer comprises a half mirror and a plurality of mirrors,
   wherein the laser beam is partly reflected from the half mirror to generate the first laser beam and is partly transmitted through the half mirror to generate the second laser beam, and wherein the plurality of mirrors are arranged such that the second laser beam is sequentially reflected from the plurality of mirrors to have an optical axis that is parallel with that of the first laser beam.

6. A method according to claim 5, wherein the second laser beam, which has been sequentially reflected from the plurality of mirrors, is partly transmitted through the half mirror, and wherein the half mirror is arranged to have an inclination such that the first laser beam, which baa been reflected from the half mirror, and the second laser beam, which has been partly transmitted through the half mirror, become adjacent to each other.

7. A method for putting color to glass, comprising the steps of:

(a) introducing a laser beam into an interferometer such that the laser beam is split into at least first and second laser beams in the interferometer and that the at least first and second laser beams come out of the interferometer; and (b) irradiating a glass with the at least first and second laser beams to write a plurality of lines simultaneously on a surface of the glass and/or in an inside of the glass, wherein the interferometer comprises first and second half mirrors and first and second mirrors, wherein the first half mirror is arranged such that the laser beam is partly transmitted through the first half mirror to generate the first laser beam and is partly reflected from the first half mirror to generate the second laser beam, wherein the first mirror and the second half mirror are arranged such that the first laser beam is reflected from the first mirror and then is partly transmitted through the second half mirror to have a first optical axis, and wherein the second mirror and the second half minor are arranged such that the second beam is reflected from the second mirror and then is partly reflected from the second half mirror to have a second optical axis that is parallel with the first optical axis of the first laser beam.

8. A method according to claim 7, wherein the second half mirror is arranged to have an inclination such that the first laser beam, which has been transmitted through the second half mirror, and the second laser beam, which has been reflected from the second half mirror, become adjacent to each other.

9. A method according to claim 2, wherein the lager oscillator is a UV pulsed laser oscillator, carbon-dioxide laser oscillator, or argon ion laser oscillator.

10. A method according to claim 1, wherein the laser beam is of an infrared light, near infrared light, visible light, or ultraviolet light.

11. A method according to claim 2, wherein the light modulator is an acoustic optical modulator or electric optical modulator.

12. A method according to claim 1, wherein the scanning is conducted by moving a focal point of the laser beam with the single pair of galvanometer mirrors.

13. A method according to claim 1, wherein the scanning is further conducted by moving the glass with a stage that supports the glass end that is movable in a horizontal direction and/or vertical direction.

14. A method according to claim 1, wherein the glass is a silver-doped, soda-lime glass such that the plurality of lines made of silver particles are written on the surface of the glass and/or in the inside of the glass.

15. A method according to claim 1, wherein the single pair of galvanometer mirrors comprises en X-mirror and a Y-mirror.

16. A method according to claim 7, further comprising the step of (c) scanning the glass with the at least first and second laser beams, which have come out of the interferometer, by a single pair of galvanometer mirrors.

17. A method according to claim 16, wherein the single pair of galvanometer mirrors comprises an X-mirror and a Y-mirror.

* * * * *